United States Patent [19]

Elias et al.

[11] 4,116,919

[45] Sep. 26, 1978

[54] TREATMENT OF REINFORCING SILICA

[75] Inventors: Janet L. Elias; Chi-Long Lee, both of Midland; Myron T. Maxson, Sanford, all of Mich.

[73] Assignee: Dow Corning Corporation, Midland, Mich.

[21] Appl. No.: 830,527

[22] Filed: Sep. 6, 1977

[51] Int. Cl.$^2$ ............................................. C08L 83/04
[52] U.S. Cl. ........................... 260/37 SB; 106/288 Q; 106/308 N
[58] Field of Search ............... 260/37 SB; 106/308 Q, 106/288 Q, 308 N

[56] References Cited

U.S. PATENT DOCUMENTS

| 3,243,404 | 3/1966 | Martellock | 260/37 SB |
| 3,635,743 | 1/1972 | Smith | 106/288 Q |
| 4,064,096 | 12/1977 | Gibard | 260/37 SB |

*Primary Examiner*—Lewis T. Jacobs
*Attorney, Agent, or Firm*—Roger H. Borrousch

[57] ABSTRACT

An improved treatment for reinforcing silica uses both a silazane represented by the formula (RR'R"Si)$_2$NH and bis-Si-(1-methyl-1-silacyclopentenyl) amine as filler treatment. The filler treatment may be done either in situ during the manufacture of curable silicone elastomer compositions or as a separate operation. The treatment allows production of an easily extrudable composition with improved durometer and tear strength.

11 Claims, No Drawings

TREATMENT OF REINFORCING SILICA

BACKGROUND OF THE INVENTION

1. Field of the Invention

This invention relates to a finely divided silica treated with a mixture of silazanes for use in heat cured silicone elastomers.

2. Description of the Prior Art

In the silicone elastomer art, the treatment of reinforcing silica fillers is now well known as a means of preventing the reaction between the silica filler and the silicone polymer which produces "structuring" or "crepe aging" with a subsequent loss of workability of the mixture. U.S. Pat. No. 3,243,404 describes silyl amine processing aids for use in preventing the above undesirable reaction. U.S. Pat. No. 3,635,743 describes the use of a process of contacting the filler first with ammonia and then with hexamethyldisilazane.

One of the current types of curable silicone elastomer compositions comprises compositions containing both silicon-bonded hydrogen atoms and aliphatically unsaturated bonds. Recent work with this curing system has developed special formulations particularly suitable for use in low pressure molding systems where the reactive ingredients are pumped together into a mold, being mixed during or immediately preceeding the transfer process, and cured very rapidly to yield elastomeric articles. A silica filler treated as disclosed by the present invention is particularly suitable for use in compositions designed to be used in such low pressure molding systems as it imparts reinforcing of the silicone polymer without raising the viscosity of the mixture to a point where it is no longer useful in the system.

SUMMARY OF THE INVENTION

Reinforcing silica is treated with bis-Si-(1-methyl-1-silacyclopentenyl) amine (a) and silazane (b) represented by the formula $(RR'R''Si)_2NH$ where R, R', and R" are selected from a group consisting of lower alkyl, phenyl, and 2-(perfluoroalkyl) ethyl radicals in which the perfluoroalkyl radical is trifluoromethyl, perfluoroethyl, or perfluoroisobutyl. The treated silica is particularly useful in the production of silicone elastomer compositions used in low pressure molding systems; in that the use of this treated silica gives low viscosity mixtures which cure to yield silicone elastomers. Low viscosity mixtures can be molded at low pressures and cured to yield silicone elastomers with physical properties comparable to other types of treated silica reinforced elastomers. These other types of treated silicas do not produce low viscosity mixtures.

DESCRIPTION OF THE INVENTION

This invention relates to a treated silica consisting essentially of a finely divided silica with a surface area of at least 50 square meters per gram, said silica having been mixed with treating agent consisting essentially of silazanes of the formulae

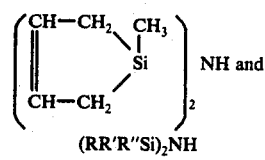
(a)

$(RR'R''Si)_2NH$ (b)

where each R, R', and R" is selected from a group consisting of lower alkyl, phenyl, and 2-(perfluoroalkyl) ethyl radicals in which the perfluoroalkyl radical is trifluoromethyl, perfluoroethyl, or perfluoroisobutyl, there being from 0.08 to 0.22 mole of treating agent per 25,000 square meters of silica surface, the mole ratio of (a) to (b) in the treating agent being from 1:5 to 1:40.

This invention is based on the discovery that the treated silica described above can be used to reinforce polydiorganosiloxane fluids that are subsequently compounded with crosslinking organohydrogensiloxanes and platinum containing catalysts to yield cured silicone elastomers with desirable physical properties. These physical properties are obtained through the use of the unique treatment of the silica filler and not through the use of larger amounts of filler. The use of larger amounts of previously available fillers is not satisfactory in many cases as this method of improving physical properties also increases the viscosity of the uncured mixture to levels that require heavier, more expensive molds and heavier, more expensive means of forcing the mixture into the mold for shaping and curing.

Through the use of the treated silica of this invention, it is possible to produce uncured compositions suitable for use in low pressure molding systems for elastomers currently being developed. These systems require an uncured composition capable of being pumped or pushed by air pressure, 0.6 to 0.7 MPa for example, rather than being forced into the mold by a ram or extrusion screw as used in conventional molding processes for elastomers.

The reinforcing silica used in the preparation of the present invention can be any of the conventional reinforcing silica fillers with a surface area of at least 50 square meters per gram. These reinforcing silica fillers are well known in the art and can be obtained commercially. They are most often produced by burning silanes, for example silicon tetrachloride. The preferred silicas have surface areas from 200 to 400 square meters per gram. The surface of the silica normally contains Si—OH groups as well as Si—O—Si groups. A certain amount of water may also be absorbed on the surface.

Bis-Si-(1-methyl-1-silacyclopentenyl) amine (a) is used as one component of the treating agent of the present invention for modification of the surface of the reinforcing silica. This treating agent component may be produced by reacting 1-chloro-1-methyl-1-silacyclopentene with ammonia as disclosed in U.S. Pat. No. 3,927,057 to Takamizawa et al. to yield the amine. The 1-chloro-1-methyl-1-silacyclopentene may be produced by reacting methyltrichlorosilane with a butadiene of the formula $H_2C=CH-CH=CH_2$ as disclosed in U.S. Pat. No. 3,509,191 to Atwell.

The bis-Si-(1-methyl-1-silacyclopentenyl) amine is represented by the formula

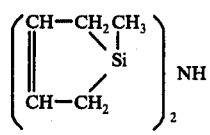

However, the present invention also includes the isomer of the formula

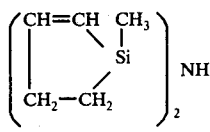

The preparation of the silacyclopentenyl group usually results in a mixture of both isomers. Mixtures of the isomers are also included in the present invention.

The other treating agent component of the present invention is a silazane (b) of the formula (RR'R"Si)$_2$NH where R, R', R" are selected from a group consisting of lower alkyl radicals such as methyl, ethyl, propyl, phenyl, and 2-(perfluoroalkyl) ethyl radicals in which the perfluoroalkyl radical is trifluoromethyl, perfluoroethyl, or perfluoroisobutyl. Many of these types of silazanes are commercial products. They may be prepared by the procedure of U.S. Pat. No. 3,481,964, Ismail et al. by combining the halogen silane of the formula (RR'R")SiX with ammonia.

The reinforcing silica may be mixed with the treating agent either as a separate step before mixing the reinforcing silica with the polydiorganosiloxane fluid or during the mixing of the reinforcing silica with the polydiorganosiloxane fluid. The latter method is the best method as it is more economical.

The reinforcing silica may be treated by vigorously stirring the silica in a closed container with the desired amount of treating agent. The silica normally has enough water absorbed on its surface to provide the reaction with the treating agent but additional water may be added in amounts up to about 5 parts by weight of water per 100 parts by weight of silica. Both (a) and (b) of the treating agent may be added together or they may be added separately, although the results are more uniform when (a) and (b) are added together. The step of mixing the silica and the treating agent may take place in a closed container as described above or they may be mixed by dispersing the silica first in a solvent non-reactive to the treating agent, for instance toluene, and then adding the treating agent. After thorough mixing, which is usually accomplished by stirring for 4 to 24 hours, the solvent, if used, and excess treating agent and ammonia produced by the hydrolysis of the silazane treating agent are removed by air drying, heating, vacuum, or a combination of means. An excess of treating agent is normally used to assure complete treatment of the silica surface as any unreacted treating agent is easily removed in the process. A large excess of treating agent is not harmful as it is removed, but it would not be economical. The minimum amount of (a) and (b) is about 0.08 moles of treating agent per 25,000 square meters of silica surface area while 0.22 mole is a practical upper limit. The preferred amount of treating agent is from 0.1 to 0.2 mole of treating agent per 25,000 square meters of silica surface area. The mole ratio of (a) to (b) is from 1:5 to 1:40 and the preferred range is 1:10 to 1:25. The ratio of treating agent to obtain the most desirable physical properties of the final curable silicone elastomer can be determined by simple experimentation since the most desirable ratio of treating agent is dependent upon the specific ingredients used in the curable silicone elastomer for the polydiorganosiloxane fluid, organohydrogensiloxane crosslinker, and platinum catalyst.

The reinforcing silica may also be mixed with the treating agent during the mixing of the silicone elastomer base to produce an in situ treated reinforcing silica. In this process the polydiorganosiloxane fluid is added to a suitable mixer, for instance a dough mixer and the treating agent is dispersed into the fluid along with water, if water is used. The silica is then added with mixing. After dispersion of the silica in the fluid and treating agent mixture, the mixture is heated to promote reaction between the silica and the treating agent. A normal heating period would be 1 to 4 hours at 100° to 200° C. Since some silazanes are volatile materials and flammable it is good practice to keep the mixer sealed during the mixing procedure with a nitrogen sweep to eliminate oxygen and the danger of fire or explosion. A vacuum on the mixer can be used to draw off excess treating agent and other volatile materials in the polydiorganosiloxane fluid. The amount of silazane treating agent [(a) + (b)] may be varied from 0.08 mole to 0.22 mole per 25,000 square meters of silica surface area with the preferred amount being between 0.1 and 0.15 mole. The mole ratio of (a) to (b) may be from 1:5 to 1:40 and the preferred range is 1:10 to 1:25. The ratio of treating agent to obtain the desirable physical properties of the final curable silicone elastomer can be determined by simple experimentation since the most desirable ratio of treating agent is dependent upon the specific ingredients used in the curable silicone elastomer for the polydiorganosiloxane fluid, organohydrogensiloxane crosslinker, and platinum catalyst.

The vinyl-containing polydiorganosiloxane fluids used in this invention are well known in the art. The polydiorganosiloxane fluid has an average of two silicon-bonded vinyl radicals per molecule, only one vinyl radical is bonded to any one silicon atom, and the remaining organic radicals can be methyl, ethyl, phenyl, or 3,3,3-trifluoropropyl radicals, there being from 0 to 50 inclusive percent 3,3,3-trifluoropropyl radicals. The phenyl radicals can be present in an amount from 0 to 30 percent inclusive, all percentages being based on the total number of organic radicals in the polydiorganosiloxane fluid. The polydiorganosiloxane fluid is endblocked by triorganosiloxy groups. The triorganosiloxy groups have organic radicals selected from the same group of organic radicals listed above. The preferred polydiorganosiloxane fluid is endblocked by vinyldiorganosiloxy groups, as illustrated by the formula:

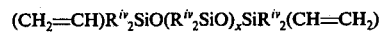

where each $R^{iv}$ is a radical as defined above for the organic radicals and x has a value such that the viscosity is from 0.2 Pa.s up to gum consistencies. Mixtures of polydiorganosiloxanes can be used.

The organohydrogen siloxanes containing silicon-bonded hydrogen atoms are also well known in the art such as described by Polmanteer et al. in U.S. Pat. No. 3,697,473 and Lee et al. in U.S. Pat. No. 3,989,668 which patents are hereby incorporated by reference to show examples of organohydrogen siloxanes known in the art. The organohydrogen siloxanes useful in the present invention can be any siloxane having an average of at least 2.1 silicon-bonded hydrogen atoms per molecule and an average of no more than one silicon-bonded hydrogen atoms per silicon atom. The remaining valences of the silicon atoms are satisfied by divalent oxygen atoms or by monovalent hydrocarbon radicals having less than 6 carbon atoms per radical such as methyl, isopropyl, tertiary butyl, and cyclohexyl, and phenyl, and 3,3,3-trifluoropropyl radicals. The organohydrogensiloxanes can be homopolymers, copolymers, and mixtures thereof which contain siloxane units of the following types: $R_2SiO$, $R_3SiO_{0.5}$, $H(CH_3)SiO$, and $H(CH_3)_2SiO_{0.5}$ where R is the monovalent hydrocarbon defined above. Some specific examples include polymethylhydrogensiloxane cyclics, copolymers of trimethylsiloxy and methylhydrogensiloxane units, copolymers of dimethylhydrogensiloxy and methylhydrogen siloxane units, copolymers of trimethylsiloxy, dimethylsiloxane, and methylhydrogensiloxane units, and copolymers of dimethylhydrogensiloxy, dimethylsiloxane, and methyl hydrogensiloxane units. Preferably the organohydrogen siloxanes have an average of at least 5 silicon-bonded hydrogen atoms per molecule.

The compositions of this invention may be cured with the aid of a catalyst (g) which can be any of the platinum-containing catalysts that are known to catalyze the reaction of silicon-bonded hydrogen atoms with silicon-bonded vinyl groups and which are soluble in polydiorganosiloxane fluid (c). Platinum-containing catalysts which are not soluble in said fluid are not sufficiently effective to provide for the compositions of this invention. A class of platinum-containing catalysts particularly suitable for use in the compositions of this invention are the complexes of chloroplatinic acid described by Willing in U.S. Pat. No. 3,419,593 which is hereby incorporated by reference to show the preparation of said complexes and the complexes per se. A preferred catalyst, described by Willing, is a platinum-containing complex which is the reaction product of chloroplatinic acid and sym-divinyltetramethyldisiloxane.

The platinum-containing catalyst (g) is present in an amount sufficient to provide at least one part by weight of platinum for every one million parts by weight of polydiorganosiloxane fluid (c). It is preferred to use sufficient catalyst (g) so that there is present from 5 to 50 parts by weight platinum for every one million parts by weight of polydiorganosiloxane fluid (c). It is to be understood that amounts of platinum greater than the 50 parts per million stated above are also effective in the compositions of this invention but said larger amounts, especially when the preferred catalyst is used, are unnecessary and wasteful.

A mixture of components (c), (f) and (g) may begin to cure immediately on mixing at room temperature, therefore it is necessary to inhibit the action of the catalyst (g) at room temperature with a platinum catalyst inhibitor if the composition is to be stored before molding.

One type of platinum catalyst inhibitor suitable for use, is the acetylenic inhibitors described in U.S. Pat. No. 3,445,420 to Kookootsedes et al. which is hereby incorporated by reference to show the preparation of acetylenic inhibitors and their use as inhibitors.

A second type of platinum catalyst inhibitor is the olefinic siloxanes that are described in U.S. Pat. No. 3,989,667 to Lee and Marko which is hereby incorporated by reference to show the preparation of olefinic siloxanes and their use in silicone compositions as platinum catalyst inhibitors.

A third type of platinum catalyst inhibitor suitable for use are the vinylorganocyclosiloxanes of the formula

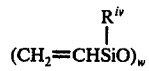

wherein $R^{iv}$ is methyl, ethyl, phenyl, or 3,3,3-trifluoropropyl and $w$ has an average value of from 3 to 6. Vinylorganocyclosiloxanes are well known in the organosilicon art, especially where $R^{iv}$ is methyl and $w$ is 3, 4, or 5.

The amount of platinum catalyst inhibitor that may be used in the compositions of this invention is simply the amount needed to produce the desired shelf life and yet not extend the cure time of the compositions of this invention to an impractical level. This amount will vary widely and will depend upon the particular inhibitor that is used, the nature and concentration of the platinum-containing catalyst (g) and the nature of the organohydrogensiloxane (f).

Inhibitor added in amounts as small as one mole of inhibitor for every mole of platinum will in some instances cause an inhibition of the catalyst (g) and afford a satisfactory pot life. In other cases, considerably more inhibitor, such as 10, 50, 100, 500 and more moles of inhibitor for every mole of platinum may be needed to achieve the desired combination of pot life and cure time. The exact amount of any particular inhibitor to be used in the compositions of this invention should be determined by simple experimentation.

The inhibiting effect of platinum catalyst inhibitor can be overcome by heating the compositions of this invention to a temperature of 70° C. or higher.

The amounts of the various ingredients used in the present invention depend upon the desired properties of the final elastomer. In general, as more treated silica is added, the hardness and tensile strength of the cured product increases. However, the amount of filler used should not be so great that the viscosity of the uncured compound becomes too high for practical use in the molding process being used, particularly if the molding process is a low pressure molding system. The compositions of the present invention may be formulated so they may be injected into light weight molds under low pressures, such as 600 kPa cylinder pressure, in a liquid injection molding process. The compositions can be cured very rapidly in a hot mold and removed without cooling the mold in such a liquid injection molding process. The upper viscosity limit of a composition using predominantly reinforcing silica filler is about 160 Pa.s for use in such a process.

The amount of treated silica used is from 5 to 100 parts by weight based upon 100 parts by weight of the polydiorganosiloxane fluid. The preferred range is from 20 to 60 parts.

The compositions of this invention may contain other components that are common to the silicone rubber art, such as pigments, extending fillers, anti-oxidants, compression set additives, and thermal stability additives as long as the desirable properties of said compositions are not compromised thereby.

The compositions of this invention are obtained whenever the recited components are mixed together. If the reinforcing silica is mixed with the treating agent as a separate step, as discussed above, the treated silica is then mixed with the polydiorganosiloxane fluid to produce a silicone elastomer base (e). The polydiorganosiloxane fluid, treating agent, the reinforcing silica may be mixed together, as also described above, to produce a polydiorganosiloxane base containing an in situ treated silica (j). In either case the base is then further processed in manners well known in the art to yield a curable silicone elastomer composition by mixing in the required organohydrogensiloxane and platinum catalyst, as well as, the optional inhibitor, if the composition is not being molded immediately, and any of the other specialized additives common to the silicone elastomer art, as long as they do not interfere with the required cure.

The order of mixing is not critical; however, if the composition is not to be used immediately or if the composition is to be used in a method of liquid injection molding, it is preferred to have inhibitor present when base (e) or (j), organohydrogensiloxane (f) and catalyst (g) are mixed, since a curing reaction involving these components begins immediately at room temperature if inhibitor is not present.

Since component (f) and the inhibitor frequently are volatile or contain volatile compounds, it is preferred that said components be mixed after heating and/or vacuum operations in the preparation of the compositions of this invention have been completed. It is also preferred that no component or mixture of components be heated above 300° C. during the preparation of the compositions of this invention.

The compositions of this invention are curable by heating them to a temperature sufficient to cause curing, preferably greater than 100° C., either in a confined area or exposed to the atmosphere. Curing temperatures of greater than 300° C., would be avoided. The compositions of this invention are useful in any type of molding operation providing the required temperatures and times to produce the desired degree of cure are available.

The following examples are included for illustrative purposes only and should not be construed as limiting the invention which is properly delineated by the appended claims. All parts are parts by weight.

EXAMPLE 1

A series of compositions was prepared by mixing 100 parts of phenylmethylvinylsiloxy endblocked dimethylsiloxane fluid with a viscosity of approximately 30 Pa.s at 25° C., 40 parts of a treated filler as described below, 0.24 parts of a platinum catalyst in the form of a chloroplatinic acid complex with symetrical divinyltetramethyldisiloxane containing about 0.65 percent platinum, 0.03 parts of 3,5-dimethyl-1-hexyn-3-ol cure inhibitor and 0.66 parts of a trimethylsiloxy endblocked polyorganosiloxane crosslinker having an average of 5 methylhydrogensiloxane units and 3 dimethylsiloxane units per molecule.

This formulation gave a ratio of silicon-bonded hydrogen (SiH) in the crosslinker to silicon-bonded vinyl (SiVi) in the siloxane fluid of 2:1.

Filler A was prepared by drying fume silica with a surface area of approximately 250 square meters per gram for 24 hours at 150° C. The 178g of filler was placed in 5 liter flask equipped with stirrer, addition funnel, and condenser. The filler was then covered with toluene. The stirrer was started and 8.9g of water was added. Then 53.02g of hexamethyldisilazane was added slowly through the addition funnel. Stirring was continued for 48 hours. The treated filler was then removed from the flask and air dried for 72 hours, followed by oven drying 24 hours at 150° C. to remove all moisture, ammonia, and unreacted treating agent. This preparation represents the prior art.

Filler B was prepared following the procedure of filler A with the exception that the treating agent was a mixture of 53.24g (0.33 mole) of hexamethyldisilazane and 5.27g (0.033 mole) of 1,3-divinyltetramethyldisilazane added to 198g of filler. This preparation represents the prior art.

Filler C was prepared by following the procedure of filler A with the exception that the treating agent was a mixture of 49.37g (0.31 mole) of hexamethyldisilazane and 5.73g (0.031 mole) of bis-Si-(1-methyl-1-silacyclopentenyl)amine added to 185g of filler.

Each composition was molded into a sheet and cured 15 minutes at 175° C. Part of the sheet was then post cured for 70 hours at 200° C. Physical properties were measured in accordance with the procedures of ASTM D412 for tensile and elongation, with ASTM D624 die B for tear, and with ASTM D2240 for durometer. The 100% modulus is the tensile stress at 100% strain. The test results were as shown in Table 1.

EXAMPLE 2

The composition of Example 1 was repeated using filler C with the exception that the amount of crosslinker used was 0.58 parts in one experiment to give a mole ratio of SiH to SiVi of 1.75:1 and 0.50 parts in a second experiment to give a ratio of SiH to SiVi of 1.5:1. The test results were as shown in Table I.

EXAMPLE 3

Filler D was treated by using the procedure of Example 1, filler A. The amounts of material used were 252g of silica, 12.5g of water, 67.2g of hexamethyldisilazane and 7.8g of bis-Si-(1-methyl-1-silacyclopentenyl)amine. The final drying was 16 hours at 150° C. This filler was then made into a composition identical to that of Example 1. The physical properties of a cured sheet were as shown in Table I.

TABLE I

| Example | Filler | SiH/SiVi | Tensile MPa | Elongation | 100% Modulus MPa | Durometer | Tear kN/m |
|---|---|---|---|---|---|---|---|
| Cured 15 min/175° C | | | | | | | |
| 1 | A | 2/1 | 9.2 | 862 | 0.45 | 29 | 24 |
| 1 | B | 2/1 | 10.5 | 757 | 0.81 | 40 | 32.7 |
| 1 | C | 2/1 | 9.2 | 927 | 0.5 | 30 | 28.9 |
| 2 | C | 1.75/1 | 8.8 | 898 | — | 27 | 29.8 |
| 2 | C | 1.5/1 | 8.9 | 997 | — | 27 | 29.4 |
| 3 | D | 2/1 | 9.0 | 894 | 0.6 | 32 | 33.6 |
| Cured 70 hr/200° C | | | | | | | |
| 1 | A | 2/1 | 10.5 | 612 | 1.1 | 50 | 29.2 |
| 1 | B | 2/1 | 9.2 | 526 | 1.4 | 52 | 27.1 |
| 1 | C | 2/1 | 10.0 | 561 | 1.3 | 54 | 31.1 |
| 2 | C | 1.75/1 | 11.0 | 600 | — | 55 | 29.6 |
| 2 | C | 1.5/1 | 10.5 | 641 | — | 53 | 29.8 |
| 3 | D | 2/1 | 10.0 | 547 | 1.5 | 57 | 25.0 |

6.895 MPa = 1000 psi
175 kN/m = 1000 ppi

That which is claimed is:

1. A treated silica consisting essentially of finely divided silica with a surface area of at least 50 square meters per gram, said silica having been mixed with treating agent consisting essentially of silazanes of the formulae

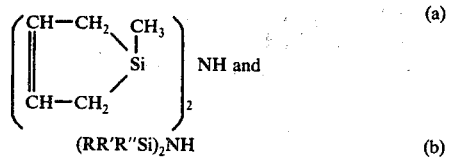

where each R, R', and R" is selected from a group consisting of lower alkyl, phenyl, and 2-(perfluoroalkyl) ethyl radicals in which the perfluoroalkyl radical is trifluoromethyl, perfluoroethyl, or perfluoroisobutyl, there being from 0.08 to 0.22 mole of treating agent per 25,000 square meters of silica surface, the mole ratio of (a) to (b) in the treating agent being from 1:5 to 1:40.

2. The composition in accordance with claim 1 in which there is also present (c) 100 parts by weight of a triorganosiloxy endblocked polydiorganosiloxane fluid wherein each organic radical is selected from a group consisting of methyl, ethyl, vinyl, phenyl, and 3,3,3-trifluoropropyl radicals, there being an average of 2 vinyl radicals per molecule and only one vinyl radical bonded to any one silicon atom, there being from 0 to 50 inclusive percent 3,3,3-trifluoropropyl radicals and from 0 to 30 inclusive percent of phenyl radicals, both being based on the total number of organic radicals in the polysiloxane fluid, for each 5 to 100 parts by weight of the treated silica to yield a silicone elastomer base (e).

3. The composition in accordance with claim 2 in which there is also present (f) an organohydrogensiloxane having an average of at least 2.1 silicon-bonded hydrogen atoms per molecule, no silicon atom having bonded thereto more than one silicon-bonded hydrogen atom, said organohydrogensiloxane consisting essentially of units selected from a group consisting of H(CH$_3$)SiO units, R$_2$SiO units, H(CH$_3$)$_2$SiO$_{0.5}$ units, and R$_3$SiO$_{0.5}$ units, R being selected from a group consisting of lower alkyl, phenyl, and 2-(perfluoroalkyl) ethyl radicals in which the perfluoroalkyl radical is trifluoromethyl, perfluoroethyl, or perfluoroisobutyl, the amount of organohydrogensiloxane being sufficient to provide from 1.2 to 3 inclusive silicon-bonded hydrogen atoms for every vinyl group in the silicone elastomer base (e), and (g) a platinum catalyst, soluble in the polydiorganosiloxane fluid, and providing at least 1 part by weight of platinum for every one million parts by weight of polydiorganosiloxane fluid to yield a curable silicone elastomer composition.

4. A process comprising mixing (h) finely divided silica with a surface area of at least 50 square meters per gram, (a) a silazane of the formula

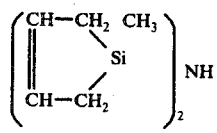

(b) a silazane of the formula

in which (a) and (b) are present in an amount sufficient to provide from 0.08 to 0.22 mole of total silazane per 25,000 square meters of silica surface area, the mole ratio of (a) to (b) being from 1:5 to 1:40, where each R, R', and R" is selected from a group consisting of lower alkyl, phenyl, and 2-(perfluoroalkyl) ethyl radicals in which the perfluoroalkyl radical is trifluoromethyl, perfluoroethyl, or perfluoroisobutyl to yield a treated silica (d).

5. A process comprising mixing a treated silica of claim 4 with (c) 100 parts by weight of a triorganosiloxy endblocked polydiorganosiloxane fluid wherein each organic radical is selected from a group consisting of methyl, ethyl, vinyl, phenyl, and 3,3,3-trifluoropropyl radicals, there being an average of 2 vinyl radicals per molecule and only one vinyl radical bonded to any one silicon atom, there being from 0 to 50 inclusive percent 3,3,3-trifluoropropyl radicals and from 0 to 30 inclusive percent of phenyl radicals, both being based on the total number of organic radicals in the polysiloxane fluid, for each 5 to 100 parts by weight of the treated silica to yield a silicone elastomer base (e).

6. A process comprising mixing a silicone elastomer base of claim 5 with (f) an organohydrogen siloxane having an average of at least 2.1 silicon-bonded hydrogen atoms per molecule, no silicon atom having bonded thereto more than one silicon-bonded hydrogen atom, said organohydrogensiloxane consisting essentially of units selected from a group consisting of H(CH$_3$)SiO units, R$_2$SiO units, H(CH$_3$)$_2$SiO$_{0.5}$ units, and R$_3$SiO$_{0.5}$ units, R being selected from a group consisting of lower alkyl, phenyl, and 2-(perfluoroalkyl) ethyl radicals in which the perfluoroalkyl radical is trifluoromethyl, perfluoroethyl, or perfluoroisobutyl, the amount of organohydrogensiloxane being sufficient to provide from 1.2 to 3 inclusive silicon-bonded hydrogen atoms for every vinyl group in the silicone elastomer base (e) and (g) a platinum catalyst, soluble in the polydiorganosiloxane fluid, and providing at least 1 part by weight of platinum for every one million parts by weight of polydiorganosiloxane fluid to yield a curable silicone elastomer composition.

7. A process comprising mixing (c) 100 parts by weight of triorganosiloxy endblocked polydiorganosiloxane fluid wherein each organic radical is selected from a group consisting of methyl, ethyl, vinyl, phenyl, and 3,3,3-trifluoropropyl radicals, there being an average of 2 vinyl radicals per molecule and only one vinyl radical bonded to any one silicon atom, there being from 0 to 50 inclusive percent 3,3,3-trifluoropropyl radicals and from 0 to 30 inclusive percent of phenyl radicals, both being based on the total number of organic radicals in the polydiorganosiloxane fluid, (a) a silazane of the formula

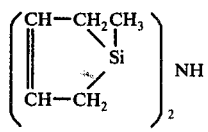

(b) a silazane of the formula

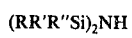

in which (a) and (b) are present in an amount sufficient to provide from 0.08 to 0.22 mole of total silazane per 25,000 square meters of silica surface area, the mole ratio of (a) to (b) being from 1:5 to 1:40, where each R, R', R'' is selected from a group consisting of lower alkyl, phenyl, and 2-(perfluoroalkyl) ethyl radicals in which the perfluoroalkyl radical is trifluoromethyl, perfluoroethyl, or perfluoroisobutyl, (h) from 5 to 100 parts by weight of finely divided silica with a surface area of at least 50 square meters per gram to produce a polydiorganosiloxane base (j) containing an in situ treated silica.

8. A process comprising mixing a polydiorganosiloxane base of claim 7 with (f) an organohydrogensiloxane having an average of at least 2.1 silicon-bonded hydrogen atoms per molecule, no silicon atom having bonded thereto more than one silicon-bonded hydrogen atom, said organohydrogensiloxane consisting essentially of units selected from a group consisting of $H(CH_3)SiO$ units, $R_2SiO$ units, $H(CH_3)_2SiO_{0.5}$ units, and $R_3SiO_{0.5}$ units, R being selected from a group consisting of lower alkyl, phenyl, and 2-(perfluoroalkyl) ethyl radicals in which the perfluoroalkyl radical is trifluoromethyl, perfluoroethyl, or perfluoroisobutyl, the amount of organohydrogensiloxane being sufficient to provide from 1.2 to 3 inclusive silicon-bonded hydrogen atoms for every vinyl groups in the polydiorganosiloxane base (j), and (g) a platinum catalyst, soluble in the polydiorganosiloxane fluid, and providing at least 1 part by weight of platinum for every one million parts by weight of polydiorganosiloxane fluid to yield a curable silicone elastomer composition.

9. A cured silicone elastomer obtained from the composition of claim 3.

10. A cured silicone elastomer obtained from the curable silicone elastomer composition produced by the process of claim 6.

11. A cured silicone elastomer obtained from the curable silicone elastomer composition produced by the process of claim 8.

* * * * *